United States Patent
Park et al.

(10) Patent No.: US 10,715,423 B2
(45) Date of Patent: Jul. 14, 2020

(54) METHOD OF TRANSMITTING DATA BASED ON PRIORITIES IN NETWORK

(71) Applicants: Hyundai Motor Company, Seoul (KR); Kia Motors Corporation, Seoul (KR); Industry-University Cooperation Foundation Hanyang University, Seoul (KR)

(72) Inventors: Seong Jin Park, Gyeonggi-Do (KR); Woo Sub Kim, Gyeonggi-Do (KR); SungKwon Park, Seoul (KR); Ju Ho Lee, Seoul (KR); Chul Sun Park, Seoul (KR); Jae Woong Ko, Gyeonggi-Do (KR); Sang Hyun Jeon, Gyeonggi-Do (KR); Li Seul Kim, Gimpo (KR)

(73) Assignees: Hyundai Motor Company, Seoul (KR); Kia Motors Corporation, Seoul (KR); Industry-University Cooperation Foundation Hanyang University, Seoul (KR)

(*) Notice: Subject to any disclaimer, the term of this patent is extended or adjusted under 35 U.S.C. 154(b) by 0 days.

(21) Appl. No.: 15/410,936

(22) Filed: Jan. 20, 2017

(65) Prior Publication Data

US 2017/0214606 A1 Jul. 27, 2017

(30) Foreign Application Priority Data

Jan. 21, 2016 (KR) .................. 10-2016-0007442

(51) Int. Cl.
*H04L 12/725* (2013.01)
*H04L 12/40* (2006.01)
(Continued)

(52) U.S. Cl.
CPC ........ *H04L 45/30* (2013.01); *H04L 12/40169* (2013.01); *H04L 45/24* (2013.01);
(Continued)

(58) Field of Classification Search
CPC . H04L 12/40169; H04L 43/028; H04L 45/02; H04L 45/24; H04L 45/30; H04L 47/31; H04L 47/32; H04L 47/74; H04L 49/3009; H04L 67/12; H04L 2012/40241; H04L 2012/40273; H04L 45/306; H04L 47/10; H04L 49/351
See application file for complete search history.

(56) References Cited

U.S. PATENT DOCUMENTS 7,031,304 B1* 4/2006 Arberg ............... H04L 43/028 370/360
2006/0256768 A1* 11/2006 Chan ..................... H04L 1/08 709/238

(Continued)

*Primary Examiner* — Khoa Huynh
(74) *Attorney, Agent, or Firm* — Mintz Levin Cohn Ferris Glovsky and Popeo, P.C.; Peter F. Corless (57) ABSTRACT

An operation method of a switch apparatus in an Ethernet-based vehicle network, includes: receiving a first frame including original data from an end node; generating a second frame including the original data; duplicating the original data to generate duplicated data; and generating a third frame including the duplicated data and an indicator indicating that the third frame includes the duplicated data.

9 Claims, 8 Drawing Sheets

(51) Int. Cl.
*H04L 12/707* (2013.01)
*H04L 12/833* (2013.01)
*H04L 29/08* (2006.01)

(52) U.S. Cl.
CPC .............. *H04L 47/31* (2013.01); *H04L 67/12* (2013.01); *H04L 2012/40241* (2013.01); *H04L 2012/40273* (2013.01)

(56) References Cited

U.S. PATENT DOCUMENTS

| | | | | |
|---|---|---|---|---|
| 2008/0107027 | A1* | 5/2008 | Allan | H04L 45/02 370/235 |
| 2012/0051332 | A1* | 3/2012 | Hole | H04W 72/1257 370/336 |
| 2013/0185451 | A1* | 7/2013 | Gelter | H04L 47/74 709/231 |
| 2016/0105379 | A1* | 4/2016 | Murthy | H04L 49/3009 370/392 |
| 2018/0375621 | A1* | 12/2018 | Turtinen | H04L 1/189 |

\* cited by examiner

METHOD OF TRANSMITTING DATA BASED ON PRIORITIES IN NETWORK

CROSS-REFERENCE TO RELATED APPLICATION

This application claims the benefit of and priority to Korean Patent Application No. 10-2016-0007442, filed on Jan. 21, 2016 in the Korean Intellectual Property Office (KIPO), the entirety of which is incorporated by reference as if fully set forth herein.

BACKGROUND

1. Technical Field

The present disclosure relates generally to data transmission methods, and more specifically, to data transmission methods based on priority remapping in a vehicle network.

2. Description of the Related Art

The number and variety of electronic devices installed within a vehicle have been increasing significantly along with the recent digitalization of vehicle parts. Electronic devices may currently be used throughout the vehicle, such as in a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices comprising each of these systems are connected via the vehicle network, which supports functions of the electronic devices. For instance, the CAN may support a transmission rate of up to 1 Mbps and may support automatic retransmission of colliding messages, error detection based on a cycle redundancy interface (CRC), or the like. The FlexRay-based network may support a transmission rate of up to 10 Mbps and may support simultaneous transmission of data through two channels, synchronous data transmission, or the like. The MOST-based network is a communication network for high-quality multimedia, which may support a transmission rate of up to 150 Mbps. Meanwhile, the telematics system, the infotainment system, as well as enhanced safety systems of a vehicle require higher transmission rates and system expandability. However, the CAN, FlexRay-based network, and the like may not sufficiently support such requirements. The MOST-based network, in particular, may support a higher transmission rate than the CAN and the FlexRay-based network. However, applying the MOST-based network to vehicle networks can be costly.

Due to these limitations, an Ethernet-based network is often utilized as a vehicle network. The Ethernet-based network may support bi-directional communication through one pair of windings and may support a transmission rate of up to 10 Gbps. The Ethernet-based vehicle network may include a plurality of communication nodes. The communication node may be a gateway, a switch (or bridge), an end node, or the like. The end node may transmit a frame including original data to the switch. Also, the switch may receive the frame from the end node, and generate an original frame including the original data. Also, the switch may generate duplicated data by duplicating the original data, and generate a duplicated frame including the duplicated data.

The original frame can be transmitted through a main path, and the duplicated frame can be transmitted through a redundancy path. Meanwhile, when a priority of the original frame (e.g., priority of the original data included in the original frame) is identical to the priority of other frames to be transmitted through the main path (e.g., priorities of data included in the other frames), preferential transmission of the original frame may not be guaranteed.

SUMMARY

The present disclosure provides a method of transmitting data based on priority remapping in a vehicle network.

In accordance with embodiments of the present disclosure, an operation method of a switch apparatus in an Ethernet-based vehicle network includes: receiving a first frame including original data from an end node; generating a second frame including the original data; duplicating the original data to generate duplicated data; and generating a third frame including the duplicated data and an indicator indicating that the third frame includes the duplicated data.

The operation method may further include transmitting the second frame through a main path; and transmitting the third frame through a redundancy path.

The second frame may further include an indicator indicating that the second frame includes the original data.

A drop eligible indicator (DEI) field included in a medium access control (MAC) header of the second frame may be set to a first value, and a DEI field included in a MAC header of the third frame may be set to a second value.

A priority of the original data may be identical to a priority of the duplicated data.

The original data may include data based on audio video bridging (AVB) protocol.

Further, in accordance with embodiments of the present disclosure, an operation method of a switch apparatus in an Ethernet-based vehicle network includes: obtaining a first frame including first original data; duplicating second original data to generate second duplicated data; obtaining a second frame including the second duplicated data; changing a priority of the second duplicated data from an original value to a value lower than a priority of the first original data; and transmitting the first frame via a communication channel.

The operation method may further include changing the priority of the second duplicated data to the original value; and transmitting the second frame via the communication channel.

The operation method may further include, when the priority of the first original data is identical to the priority of the second duplicated data, setting the priority of the second duplicated data to a value lower than the priority of the first original data.

The changing the priority of the second duplicated data may further include setting the priority of the second duplicated data to a highest priority value among priority values belonging to a best effort (BE) class.

The first frame may further include an indicator indicating that the first frame includes the first original data.

The second frame may further include an indicator indicating that the second frame includes the second duplicated data.

A drop eligible indicator (DEI) field included in a medium access control (MAC) header of the first frame may be set to a first value, and a DEI field included in a MAC header of the second frame may be set to a second value.

The first original data and the second original data may include data based on audio video bridging (AVB) protocol.

When the first original data and the second duplicated data are obtained, the switch apparatus may be determined as belonging to a contention section used for both a main path and a redundancy path, and the priority of the second duplicated data may be set to a value lower than the priority of the first original data.

According to the embodiments of the present disclosure, in case that a plurality of frames to be transmitted through a path exist, and respective data included in the plurality of frames have different priorities, a priority of duplicated data among the data included in the plurality of frames can be changed to a value lower than priorities of original data among the data included in the plurality of frames. Thus, the original data can be transmitted preferentially before the duplicated data. After completion of the transmission of the original data, the priority of the duplicated data can be changed to its original priority value, and accordingly transmission of the duplicated data can also be guaranteed.

BRIEF DESCRIPTION OF DRAWINGS

Forms of the present disclosure will become more apparent by describing in detail forms of the present disclosure with reference to the accompanying drawings, in which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, forms of the present disclosure will be described in detail with reference to the accompanying drawings. As those skilled in the art would realize, the described forms may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although embodiments are described herein as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Further, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific forms will be shown in the accompanying drawings and be described in detail in the detailed description. It should be understood, however, that it is not intended to limit the present disclosure to the specific forms but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

Figure 1:
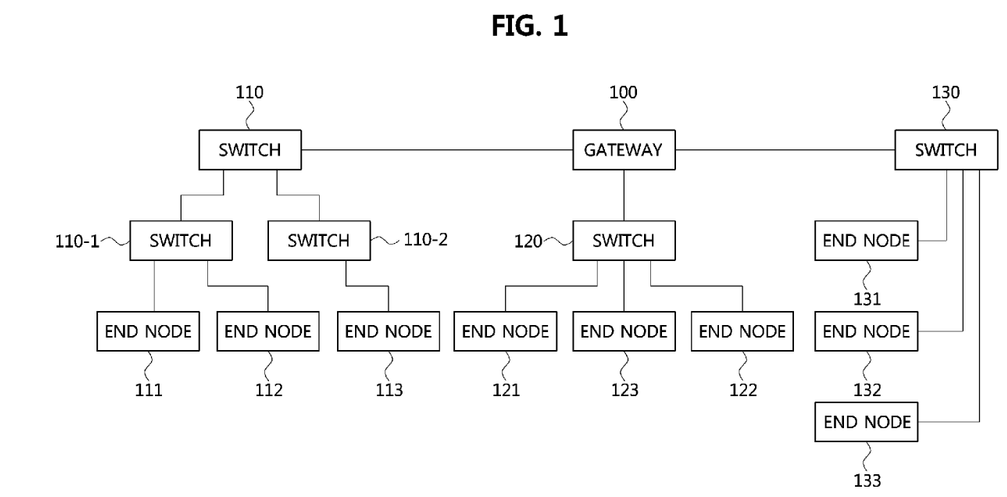
FIG. 1 is a diagram showing a vehicle network topology according to embodiments of the present disclosure.

FIG. 1 is a diagram showing a vehicle network topology according to embodiments of the present disclosure.

As shown in FIG. 1, a communication node included in the vehicle network may be a gateway, a switch (or bridge), or an end node. The gateway 100 may be connected with at least one switch 110, 110-1, 110-2, 120, and 130 and may be configured to connect different networks. For example, the gateway 100 may support connection between a switch which supports a controller area network (CAN) (e.g., FlexRay, media oriented system transport (MOST), or local interconnect network (LIN)) protocol and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of end nodes 111, 112, 113, 121, 122, 123, 131, 132, and 133 connected to the switch.

The end nodes 111, 112, 113, 121, 122, 123, 131, 132, and 133 may include an electronic control unit (ECU) configured to control various types of devices mounted within a vehicle. For example, the end nodes 111, 112, 113, 121, 122, 123, 131, 132, and 133 may include the ECU included in an infotainment device (e.g., a display device, a navigation device, and an around view monitoring device).

The communication nodes (e.g., a gateway, a switch, an end node, or the like) included in the vehicle network may be connected in a star topology, a bus topology, a ring topology, a tree topology, a mesh topology, or the like). In addition, the communication nodes of the vehicle network may support the CAN protocol, the FlexRay protocol, the MOST protocol, the LIN protocol, or the Ethernet protocol. Forms of the present disclosure may be applied to the foregoing network topologies. The network topology to which forms of the present disclosure may be applied is not limited thereto and may be configured in various ways.

Figure 2:
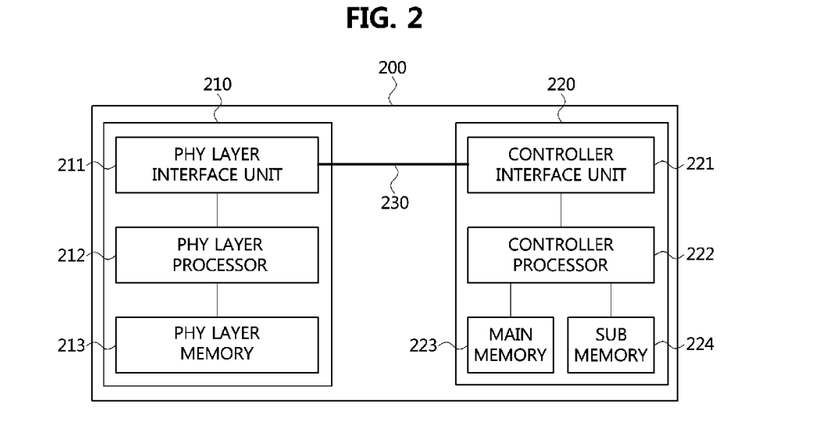
FIG. 2 is a diagram showing a communication node constituting a vehicle network according to embodiments of the present disclosure.

FIG. 2 is a diagram showing a communication node constituting a vehicle network according to embodiments of the present disclosure. Notably, the various methods discussed herein below may be executed by a controller having a processor and a memory.

As shown in FIG. 2, a communication node 200 of a network may include a PHY layer unit 210 and a controller unit 220. In addition, the communication node 200 may further include a regulator (not shown) for supplying power. In particular, the controller unit 220 may be implemented to include a medium access control (MAC) layer. A PHY layer unit 210 may be configured to receive or transmit signals from or to another communication node. The controller unit 220 may be configured to control the PHY layer unit 210 and perform various functions (e.g., an infotainment function, or the like). The PHY layer unit 210 and the controller unit 220 may be implemented as one system on chip (SoC), or alternatively may be implemented as separate chips.

Further, the PHY layer unit 210 and the controller unit 220 may be connected via a media independent interface (MII) 230. The MII 230 may include an interface defined in the IEEE 802.3 and may include a data interface and a management interface between the PHY layer unit 210 and the controller unit 220. One of a reduced MII (RMII), a gigabit MII (GMII), a reduced GMII (RGMII), a serial GMII (SGMII), and a 10 GMII (XGMII) may be used instead of the MII 230. A data interface may include a transmission channel and a reception channel, each of which may have an independent clock, data, and a control signal. The management interface may include a two-signal interface, one signal for the clock and one signal for the data.

Particularly, the PHY layer unit 210 may include a PHY layer interface unit 211, a PHY layer processor 212, and a PHY layer memory 213. The configuration of the PHY layer unit 210 is not limited thereto, and the PHY layer unit 210 may be configured in various ways. The PHY layer interface unit 211 may be configured to transmit a signal received from the controller unit 220 to the PHY layer processor 212 and transmit a signal received from the PHY layer processor 212 to the controller unit 220. The PHY layer processor 212 may be configured to execute operations of the PHY layer interface unit 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller unit 220 may be configured to monitor and control the PHY layer unit 210 using the MII 230. The controller unit 220 may include a controller interface unit 221, a controller processor 222, a main memory 223, and a sub memory 224. The configuration of the controller unit 220 is not limited thereto, and the controller unit 220 may be configured in various ways. The controller interface unit 221 may be configured to receive a signal from the PHY layer unit 210 (e.g., the PHY layer interface unit 211) or an upper layer (not shown), transmit the received signal to the controller processor 222, and transmit the signal received from the controller processor 222 to the PHY layer unit 210 or upper layer. The controller processor 222 may further include an independent memory control logic or an integrated memory control logic for controlling the controller interface unit 221, the main memory 223, and the sub memory 224. The memory control logic may be implemented to be included in the main memory 223, and the sub memory 224 may be implemented to be included in the controller processor 222.

Further, each of the main memory 223 and the sub memory 224 may be configured to store a signal processed by the controller processor 222 and may be configured to output the stored signal based on a request from the controller processor 222. The main memory 223 may be a volatile memory (e.g., a random access memory (RAM)) configured to temporarily store data required for the operation of the controller processor 222. The sub memory 224 may be a non-volatile memory in which an operating system code (e.g., a kernel and a device driver) and an application program code for performing a function of the controller unit 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

A method performed by a communication node and a corresponding counterpart communication node in a vehicle network will be described below. Although the method (e.g., signal transmission or reception) performed by a first communication node will be described below, the method is applicable to a second communication node that corresponds to the first communication node. In other words, when an operation of the first communication node is described, the second communication node corresponding thereto may be configured to perform an operation that corresponds to the operation of the first communication node. Additionally, when an operation of the second communication node is described, the first communication node may be configured to perform an operation that corresponds to an operation of a switch.

Figure 3:
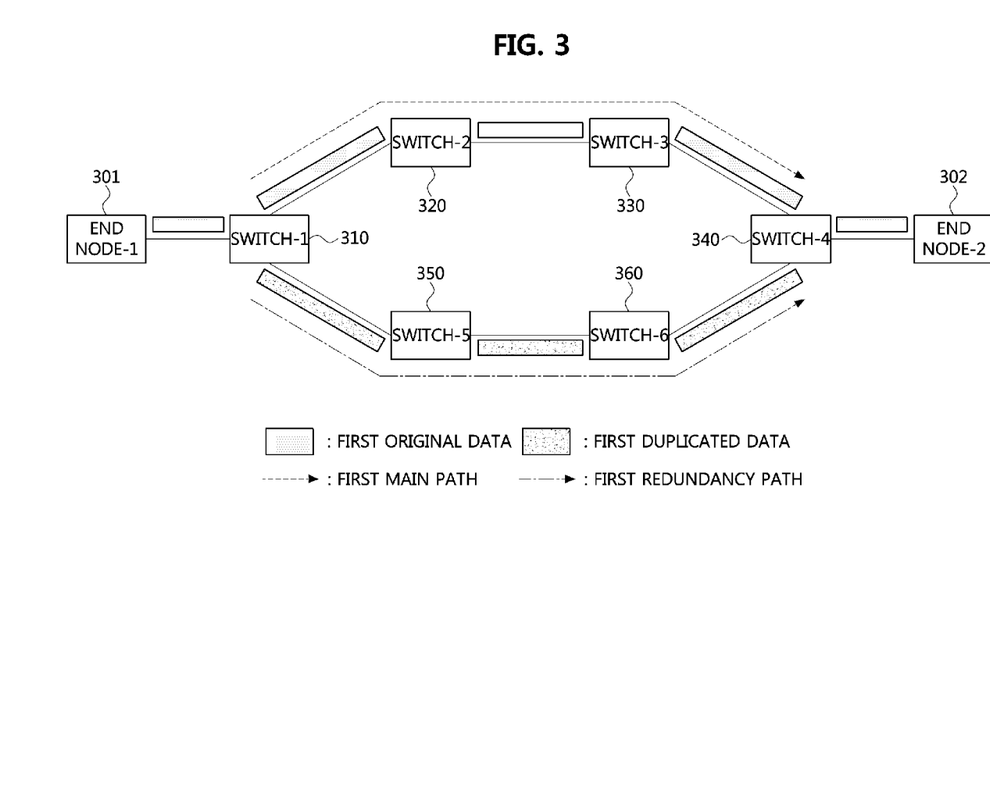
FIG. 3 is a block diagram illustrating data transmission in a vehicle network according to embodiments of the present disclosure.

FIG. 3 is a block diagram illustrating data transmission example in a vehicle network according to embodiments of the present disclosure.

As shown in FIG. 3, each of end nodes 301 and 302, and switches 310, 320, 330, 340, 350, and 360 may have a structure identical to or similar with that of the communication node 200 explained referring to FIG. 2. The end nodes 301 and 302, and the switches 310, 320, 330, 340, 350, and 360 may support IEEE 802.1AS, IEEE 802.1Qav, IEEE 802.1Qat, IEEE 802.1BA, IEEE 802.1CB, and so on. Here, the end node 301 may be a talker, and the end node 302 may be a listener corresponding to the talker.

The end nodes 301 and 302 may reserve a stream transmission based on a stream reservation protocol (SRP). For example, the end node 301 may transmit an advertisement frame in a broadcasting manner. The end node 302 may receive the advertisement frame from the end node 301, and transmit a ready frame, which is a response to the advertisement frame, to the end node 301. The end node 301 may receive the ready frame from the end node 302. Through the above-described procedure, the stream transmission may be reserved between the end node 301 and the end node 302.

After completing the reservation of the stream transmission, the end node 301 may generate a first frame including first original data, and transmit the generated first frame to the switch 310. The original data may be data based on audio video bridging (AVB) protocol. The switch 310 may receive the first frame from the end node 301. The switch 310 may transmit frames through a plurality of paths for seamless transmission. The plurality of paths may be classified into a first main path and a first redundancy path. The first main path may be configured to be 'switch 310—switch 320—switch 330—switch 340', and the first redundancy path may be configured to be 'switch 310—switch 350—switch 360—switch 340'.

The switch 310 may obtain the first original data from the first frame, and generate a second frame including the first original data. Here, the second frame may be identical to the first frame. Also, the switch 310 may generate first duplicated data by duplicating the first original data, and generate a third frame including the first duplicated data. A priority of the first original data may be identical to that of the first duplicated data. For example, priorities of the first original data and the first duplicated data may be set to a stream reservation (SR) class A or a SR class B.

The switch 310 may transmit the second frame through the first main path, and transmit the third frame through the first redundancy path. Here, the second frame and the third frame may be transmitted simultaneously. The switch 320 may receive the second frame from the switch 310, and transmit the received second frame to the switch 330. The switch 330 may receive the second frame from the switch 320, and transmit the received second frame to the switch 340. Meanwhile, the switch 350 may receive the third frame from the switch 310, and transmit the received third frame to the switch 360. The switch 360 may receive the third frame from the switch 350, and transmit the received third frame to the switch 340.

The switch 340 may receive the second frame and the third frame. In case that the switch 340 successfully receives the second frame including the first original data (e.g., in case that the second frame is not lost, or in case that an error does not exist in the second frame), the switch 340 may discard the third frame. Then, the switch 340 may transmit the second frame to the end node 302. The end node 302 may receive the second frame from the switch 340, and obtain the first original data from the received second frame.

On the contrary, in case that the second frame including the first original data is lost, or an error exists in the second frame, if the third frame including the first duplicated data is successfully received, the switch 340 may transmit the third frame to the end node 302. The end node 302 may receive the third frame from the switch 340, and obtain the first duplicated data from the received third frame.

Figure 4:
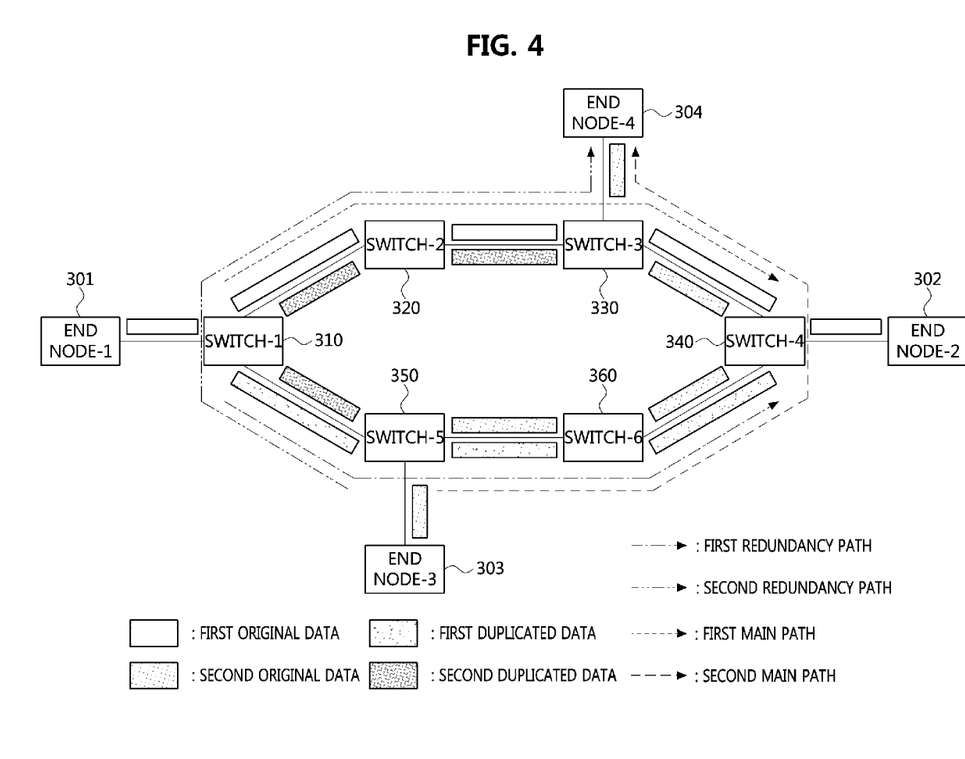
FIG. 4 is a block diagram illustrating another data transmission in a vehicle network according to embodiments of the present disclosure.

FIG. 4 is a block diagram illustrating another data transmission example in a vehicle network according to embodiments of the present disclosure.

As shown in FIG. 4, each of end nodes 301, 302, 303, and 304, and switches 310, 320, 330, 340, 350, and 360 may have a structure identical to or similar with that of the communication node 200 explained referring to FIG. 2. The end nodes 301, 302, 303, and 304, and the switches 310, 320, 330, 340, 350, and 360 may support IEEE 802.1AS, IEEE 802.1Qav, IEEE 802.1Qat, IEEE 802.1BA, IEEE 802.1CB and so on. Here, the end nodes 301 and 303 may be talkers. The end node 302 may be a listener corresponding to the end node 301, and the end node 304 may be a listener corresponding to the end node 303. The end nodes 301, 302, 303, and 304 may reserve stream transmissions based on SRP. The stream transmission from the end node 301 to the end node 302 may be performed identically to or similarly with the transmission explained referring to FIG. 3. The stream transmission from the end node 303 to the end node 304 may be performed as follows.

After completing the reservation of the stream transmission, the end node 303 may generate a fourth frame including second original data, and transmit the generated fourth frame to the switch 350. The second original data may also be data based on AVB protocol. The switch 350 may receive the fourth frame from the end node 303. The switch 350 may transmit frames through a plurality of paths for seamless transmission. The plurality of paths may be classified into a second main path and a second redundancy path. The second main path may be configured to be 'switch 350—switch 360—switch 340—switch 330', and the second redundancy path may be configured to be 'switch 350—switch 310—switch 320—switch 330'.

The switch 350 may obtain the second original data from the fourth frame, and generate a fifth frame including the second original data. Here, the fifth frame may be identical to the fourth frame. Also, the switch 350 may generate second duplicated data by duplicating the second original data, and generate a sixth frame including the second duplicated data. A priority of the second original data may be identical to that of the second duplicated data. For example, priorities of the second original data and the second duplicated data may be set to a SR class A or a SR class B. The switch 350 may transmit the fifth frame through the second main path, and transmit the sixth frame through the second redundancy path. Here, the fifth frame and the sixth frame may be transmitted simultaneously.

The switch 360 may receive the fifth frame from the switch 350, and transmit the received fifth frame to the switch 340. The switch 340 may receive the fifth frame from the switch 360, and transmit the received fifth frame to the switch 330. Meanwhile, the switch 310 may receive the sixth frame from the switch 350, and transmit the received sixth frame to the switch 320. The switch 320 may receive the sixth frame from the switch 310, and transmit the received sixth frame to the switch 330.

The switch 330 may receive the fifth frame and the sixth frame. In case that the switch 330 successfully receives the fifth frame including the second original data (e.g., in case that the fifth frame is not lost, or in case that an error does not exist in the fifth frame), the switch 330 may discard the sixth frame. Then, the switch 330 may transmit the fifth frame to the end node 304. The end node 304 may receive the fifth frame from the switch 330, and obtain the second original data from the received fifth frame.

On the contrary, in case that the fifth frame including the second original data is lost, or an error exists in the fifth frame, if the sixth frame including the second duplicated data is successfully received, the switch 330 may transmit the sixth frame to the end node 304. The end node 304 may receive the sixth frame from the switch 330, and obtain the second duplicated data from the received sixth frame.

Meanwhile, the switch 310 may have two frames to transmit to the switch 320. In case that the two frames have different priorities, the switch 310 may transmit a frame having a higher priority to the switch 320, and then transmit the other frame to the switch 320. However, when the priorities of the two frames are identical, one frame is a frame including the first original data, and the other frame is a frame including the second duplicated data, it is preferred to transmit the frame including the first original data before transmitting the frame including the second duplicated data. However, the frame including the second duplicated data may be transmitted occasionally before the frame including the first original data, and accordingly the preferential transmission of the first original data may not be guaranteed. The above-described problem may also occur in other switches 320, 330, 340, 350, and 360.

In the below description, data transmission methods according to forms of the present disclosure, performed in the vehicle network described in FIG. 3 or the vehicle network described in FIG. 4, will be explained. The vehicle network in which the data transmission methods are used is not restricted to such the vehicle networks. That is, the data transmission method, which will be explained, may be applied to various vehicle networks.

Figure 5:
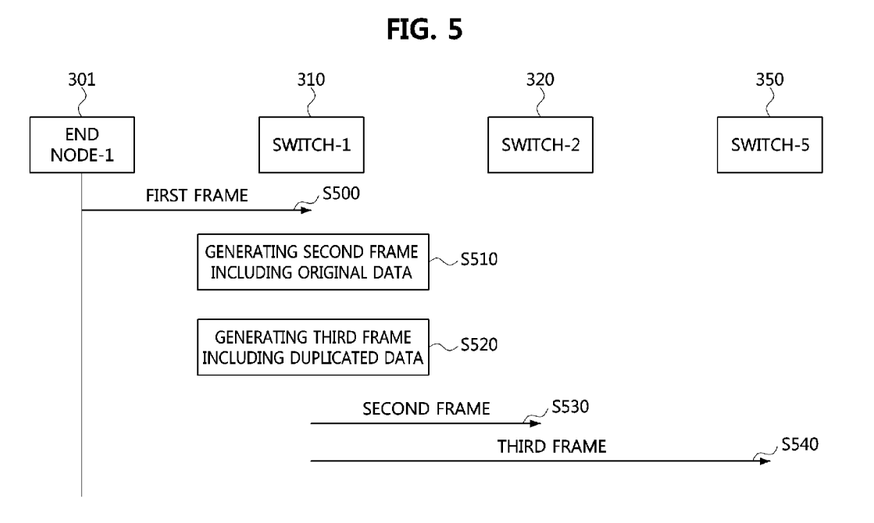
FIG. 5 is a sequence chart illustrating a data transmission method according to embodiments of the present disclosure.

FIG. 5 is a sequence chart illustrating a data transmission method according to embodiments of the present disclosure.

As shown in FIG. 5, each of the end node 301, switch 310, switch 320, and switch 350 may have a structure identical to or similar with that of the communication node 200 described in FIG. 2. Also, the end node 301, switch 310, switch 320, and switch 350 may constitute the vehicle network described in FIG. 3 and the vehicle network described in FIG. 4. The end node 301 may be a talker, and transmit a frame to the end node 302 which is a corresponding listener. The end node 301 may generate a first frame having first original data. The first original data may be AVB-based data. The first frame may be an Ethernet frame having the below structure.

Figure 6:
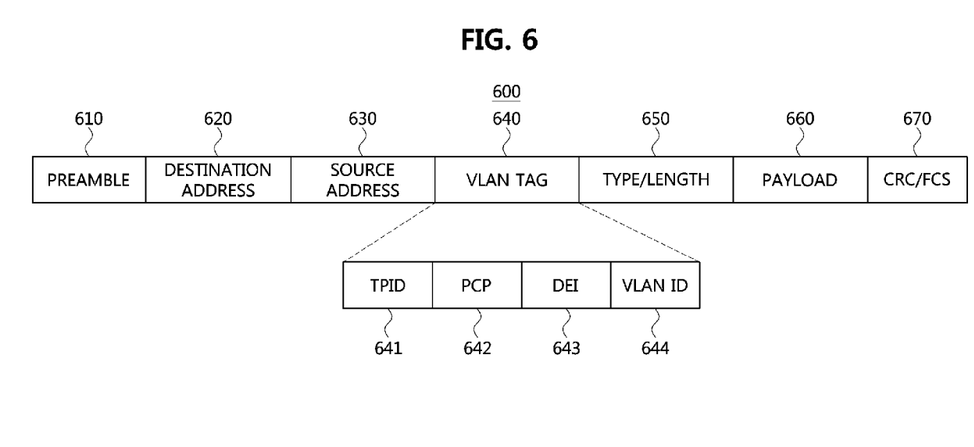
FIG. 6 is a diagram illustrating an Ethernet frame according to embodiments of the present disclosure.

FIG. 6 is a diagram illustrating an Ethernet frame according to embodiments of the present disclosure.

As shown in FIG. 6, an Ethernet frame 600 may comprise a preamble 610, a MAC header, a payload 660, and a cyclic redundancy check/frame check sequence (CRC/FCS) field 670. The preamble 610 may have the size of 8 octets, and be used for timing synchronization. The MAC header may comprise a destination address field 620, a source address field 630, a virtual local area network (VLAN) tag field 640, and a type/length field 650. The destination address field 620 may have the size of 6 octets, and comprise identification information (e.g., MAC address) of a communication node to receive the Ethernet frame 600. The source address field 630 may have the size of 6 octets, and comprise identification information (e.g., MAC address) of a communication node transmitting the Ethernet frame 600.

The VLAN tag field 640 may be a VLAN tag defined in IEEE 802.1Q. The VLAN tag field 640 may comprise a tag frame identifier (TPID) field 641 and a tag control information (TCI) field. The TPID field 641 may have the size of 16 bits, and be used for identifying a tag frame. The TCI may be indicated by a priority code point (PCP) field 642, a drop eligible indicator (DEI) field 643, and a VLAN ID field 644. The PCP field may have the size of 3 bits, and indicate a priority.

The DEI field 643 may have the size of 1 bit, and indicate whether the frame can be dropped in a specific environment (e.g., when traffic rapidly increases). For example, when the DEI field 643 is configured as a binary value '0', this may indicate that the Ethernet frame 600 is a frame which cannot be dropped. When the DEI field 643 is configured as a binary value '1', this may indicate that the Ethernet frame 600 is a frame which can be dropped. The VLAN ID field 644 may have the size of 12 bits, and be used for identifying a VLAN.

The type/length field 650 may have the size of 2 octets, and indicate the Ethernet type supported by the communication node transmitting the Ethernet frame 600 or the length of the Ethernet frame 600. For example, if the value of the type/length field 650 is not more than a decimal number 1500, the type/length field 650 may indicate the length of the Ethernet frame 600. If the value of the type/length field 650 is not less than a decimal number 1536, the type/length field 650 may indicate the supported Ethernet type. The Ethernet frame 600 may further comprise a pad field, and the pad field may be added after the payload 660.

On the other hand, the data included in the frame may have a priority, and the priority may be classified into a SR class, a best effort (BE) class, etc. The priority of the SR class may be higher than that of the BE class. The SR class may also be classified into a SR class A and a SR class B. A priority of the SR class A may be identical to or higher than that of the SR class B. The below Table 1 shows priorities of respective classes.

TABLE 1

| | The number of priority levels | | | | | | |
|---|---|---|---|---|---|---|---|
| | 2 | 3 | 4 | 5 | 6 | 7 | 8 |
| BE Class | 0 | 0 | 0 | 0 | 0 | 0 | 1 |
| | 0 | 0 | 0 | 0 | 0 | 0 | 0 |
| SR Class B | 1 | 1 | 2 | 3 | 4 | 5 | 6 |
| SR Class A | 1 | 2 | 3 | 4 | 5 | 6 | 7 |
| BE Class | 0 | 0 | 1 | 1 | 1 | 1 | 2 |
| | 0 | 0 | 1 | 1 | 1 | 2 | 3 |
| | 0 | 0 | 1 | 2 | 2 | 3 | 4 |
| | 0 | 0 | 1 | 2 | 3 | 4 | 5 |

The higher priority level indicates the higher priority. In case that two priority levels 0 and 1 are used, the priority level of the SR class A and SR class B may be set to '1', and the priority level of the BE class may be set to '0'. In case that three priority levels 0, 1, and 2 are used, the priority of SR class A may be set to '2', the priority of SR class B may be set to '1', and the priority of the BE class may be set to '0'. In case that four priority levels 0, 1, 2, and 3 are used, the priority of SR class A may be set to '3', the priority of SR class B may be set to '2', and the priority of the BE class may be set to '1' or '0'. In case that five priority levels 0, 1, 2, 3, and 4 are used, the priority of SR class A may be set to '4', the priority of SR class B may be set to '3', and the priority of the BE class may be set to '0', '1', or '2'.

In case that six priority levels 0, 1, 2, 3, 4, and 5 are used, the priority of SR class A may be set to '5', the priority of SR class B may be set to '4', and the priority of the BE class may be set to '0', '1', '2', or '3'. In case that seven priority levels 0, 1, 2, 3, 4, 5, and 6 are used, the priority of SR class A may be set to '6', the priority of SR class B may be set to '5', and the priority of the BE class may be set to '0', '1', '2', '3', or '4'. In case that eight priority levels 0, 1, 2, 3, 4, 5, 6, and 7 are used, the priority of SR class A may be set to '7', the priority of SR class B may be set to '6', and the priority of the BE class may be set to '0', '1', '2', '3', '4', or '5'.

Referring again to FIG. 5, the PCP field 642 of the first frame may indicate a priority corresponding to the SR class A or B. The end node 301 may transmit the first frame to the switch 310 (S500). The switch 310 may receive the first frame from the end node 301, and obtain first original data from the first frame. The switch 310 may generate a second frame including the first original data (S510). The second frame may include an indicator indicating that the second frame includes the first original data. For example, the DEI field 643 of the second frame may be used as the indicator. The DEI field 643 of the second frame may be set to a binary value '0', and this may indicate that the second frame includes the first original data.

The switch 310 may generate first duplicated data by duplicating the first original data, and generate a third frame including the first duplicated data (S520). A priority of the first original data may be identical to that of the first duplicated data. The third frame may include an indicator indicating that the third frame includes the first duplicated data. For example, the DEI field 643 of the third frame may be used as the indicator. The DEI field 643 of the third frame may be set to a binary value '1', and this may indicate that the third frame includes the first duplicated data.

The switch 310 may transmit the second frame through a main path (S530). In the case that the main path is configured as 'switch 310—switch 320—switch 330—switch 340', the switch 310 may transmit the second frame to the switch 320. Also, the switch 310 may transmit the third frame through a redundancy path (S540). In the case that the redundancy path is configured as 'switch 310—switch 350—switch 360—switch 340', the switch 310 may transmit the third frame to the switch 350. Here, the second frame and the third frame may be transmitted simultaneously.

The second frame may be transmitted to the switch 340 through the main path, and the third frame may be transmitted to the switch 340 through the redundancy path. In case that the second frame including the first original data is successfully received (e.g., in case that the second frame is not lost, or in case that an error does not exist in the second frame), the switch 340 may discard the third frame. Then, the switch 340 may transmit the second frame to the end node 302. The end node 302 may receive the second frame from the switch 340, and obtain the first original data from the received second frame.

On the contrary, in case that the second frame including the first original data is lost, or in case that an error exists in the second frame, when the third frame including the first duplicated data is successfully received, the switch 340 may transmit the third frame to the end node 302. The end node 302 may receive the third frame from the switch 340, and obtain the first duplicated data from the received third frame.

Figure 7:
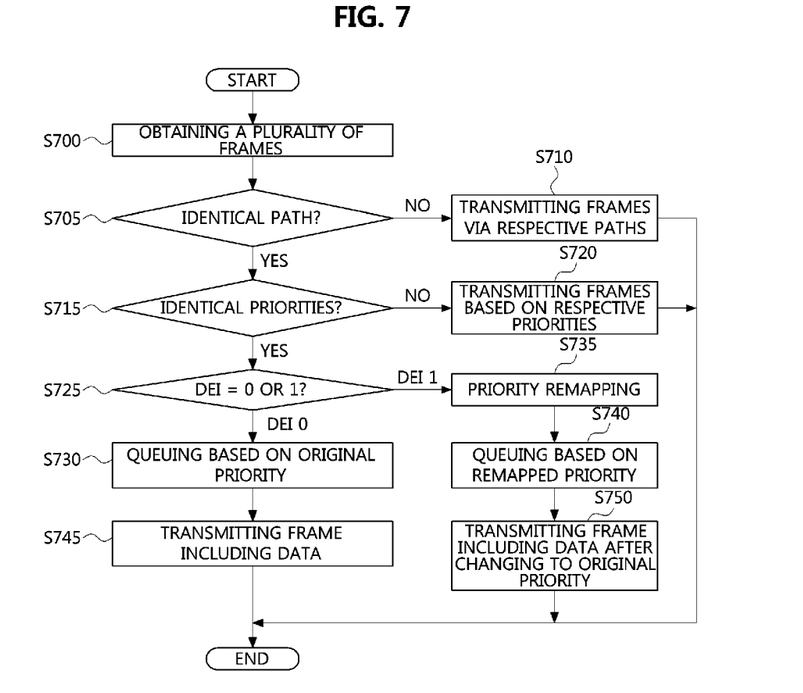
FIG. 7 is a flow chart illustrating a data transmission method according to embodiments of the present disclosure.

FIG. 7 is a flow chart illustrating a data transmission method according to embodiments of the present disclosure.

As shown in FIG. 7, a data transmission method may be performed in the vehicle network described referring to FIG. 4. The data transmission method may be performed by a switch (e.g., the switch 310, etc.) having a link used for a main path and a redundancy path both (or, belonging to a contention section used for a main path and a redundancy path both). The switch 310 may obtain a plurality of frames (S700). For example, the switch 310 may obtain first original data from the end node 301, and generate a frame including the first original data and a frame including first duplicated data generated by duplicating the first original data. Also, the switch 310 may receive, from the switch 350, a frame including second original data or a frame including second duplicated data generated by duplicating the second original data. In the following description, it is assumed that the plurality of frames include the first frame and the second frame, the first frame includes the first original data, the second frame includes the second duplicated data generated by duplicating the second original data.

The switch 310 may determine whether a communication path of the first frame is identical to that of the second frame or not (S705). In case that the path of the first frame is different from that of the second frame, the switch 310 may transmit the first frame and the second frame through respective paths (S710). On the contrary, in case that the path of the first frame is identical to that of the second frame, the switch 310 may determine whether the priority of the first original data included in the first frame is identical to that of the second duplicated data included in the second frame (S715).

In case that the priority of the first original data is different from that of the second duplicated data, the switch 310 may transmit the first frame and the second frame based on their priorities (S720). For example, when the priority of the first original data is higher than that of the second duplicated data, the switch 310 may transmit the first frame including the first original data, and then transmit the second frame including the second duplicated data. On the contrary, when the priority of the first original data is lower than that of the second duplicated data, the switch 310 may transmit the second frame including the second duplicated data, and then transmit the first frame including the first original data.

In case that the priority of the first original data is identical to that of the second duplicated data, the switch 310 may identify the DEI field of the first frame, and the DEI field of the second frame (S725). That is, the switch 310 may identify the values of DEI fields in order to identify a frame including original data or a frame including duplicated data. Here, the priority of the first original data and the priority of the second duplicated data may be SR class A or SR class B, respectively. If the DEI values of the first frame and the second frame are configured identically, the switch 310 may transmit any one of the two frames first, and then transmit the other frame. On the contrary, if the DEI values of the first frame and second frame are configured differently, the switch 310 may transmit the frames in the following manner.

In case that the DEI field of the first frame is configured as a binary value '0', this may indicate that the first frame includes original data (e.g., the first original data). Thus, the switch 310 may put the first original data to a queue according to the priority of the first original data (S730). In case that the DEI field of the second frame is configured as a binary value '1', this may indicate that the second frame includes duplicated data (e.g., the second duplicated data). In order to assign a higher priority to the first original data than the second duplicated data, the switch 310 may remap the priority of the second duplicated data so that the priority of the second duplicated data becomes lower than the priority of the first original data (S735). For example, the switch 310 may assign the highest priority among priorities of the BE class to the second duplicated data. The switch 310 may put the second duplicated data to a queue according to the remapped priority (S740). The data queued in the above-described procedure may be explained as follows.

Figure 8:
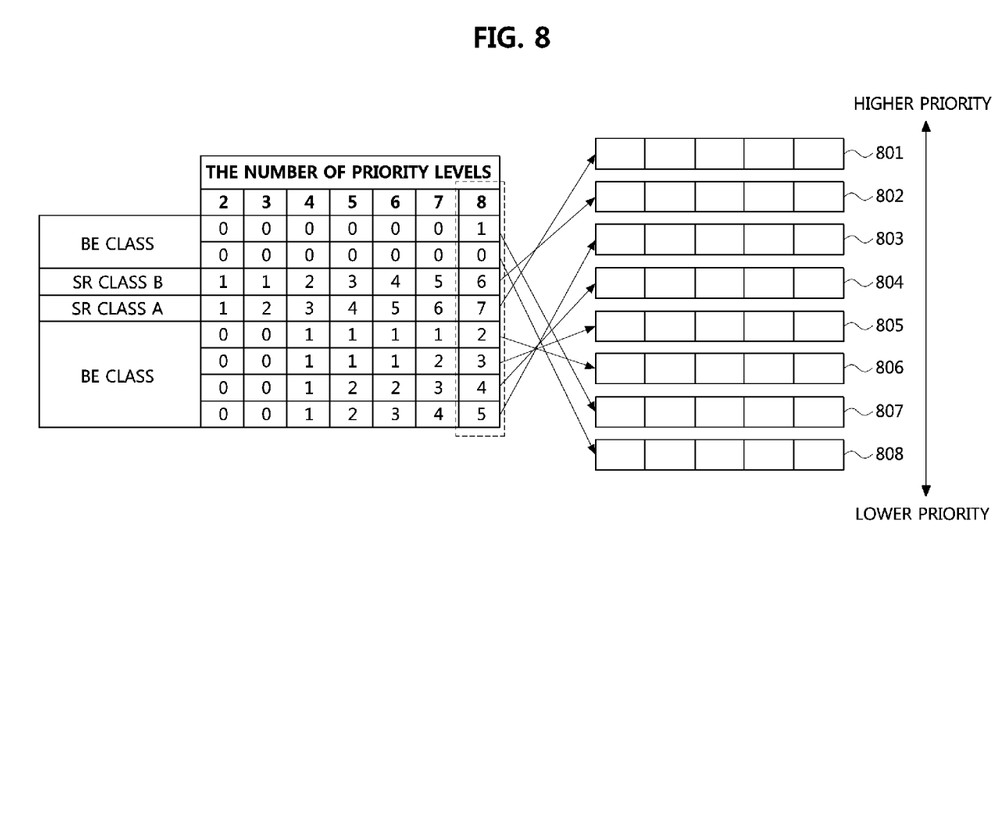
FIG. 8 is a conceptual diagram illustrating a queue according to embodiments of the present disclosure.

FIG. 8 is a conceptual diagram illustrating a queue according to embodiments of the present disclosure.

As shown in FIG. 8, the switch 310 may comprise eight queues 801, 802, 803, 804, 805, 806, 807, and 808. In case that priorities are classified into eight levels such as '0', '1', '2', '3', '4', '5', '6', and '7', the first queue 801 and second queue 802 may be used for AVB-based data, and the third queue 803, fourth queue 804, fifth queue 805, sixth queue 806, and seventh queue 807 may be used for BE data. The first original data may be put into the first queue 801, in the case that the priority of the first original data belongs to the SR class A. The first original data may be put into the second queue 802, in the case that the priority of the first original data belongs to the SR class B. The second duplicated data, the priority of which is remapped, may be put into the third queue 803. Accordingly, the first original data may be transmitted preferentially before transmission of the second duplicated data.

Referring again to FIG. 7, the switch 310 may generate a first frame including first original data, and transmit the generated first frame to another communication node (e.g., the switch 320) (S745). Then, the switch 310 may remap the priority of second duplicated data to its original priority (e.g., SR class A or SR class B), generate a second frame including the second duplicated data having the remapped priority, and transmit the generated second frame to another communication node (e.g., the switch 320) (S750).

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While embodiments of the present disclosure and their advantages have been described in detail above, it should be understood that various changes, substitutions and alterations may be made herein without departing from the scope of the disclosure.

What is claimed is:

1. An operation method of a switch apparatus in an Ethernet-based vehicle network, the operation method comprising:
    receiving a first frame including original data from an end node;
    generating a second frame including the original data;
    duplicating the original data to generate duplicated data;
    generating a third frame including the duplicated data;
    transmitting the second frame through a main path; and
    transmitting the third frame through a redundancy path,
    wherein a drop eligible indicator (DEI) field included in a medium access control (MAC) header of the second frame is set to a first value which indicates that the second frame includes original data, and a DEI field included in a MAC header of the third frame is set to a second value which indicates that the third frame includes duplicated data.

2. The operation method according to claim 1, wherein a priority of the original data is identical to a priority of the duplicated data.

3. The operation method according to claim 1, wherein the original data includes data based on audio video bridging (AVB) protocol.

4. An operation method of a switch apparatus in an Ethernet-based vehicle network, the operation method comprising:
    obtaining a first frame including first original data;
    obtaining a second frame including second duplicated data, wherein the second duplicated data is data generated by duplicating second original data, which is different from the first original data;
    changing a priority of the second duplicated data from an original value to a value lower than a priority of the first original data;
    transmitting the first frame via a communication channel; and
    transmitting the second frame via the communication channel after transmitting the first frame wherein a drop eligible indicator (DEI) field included in a medium access control (MAC) header of the first frame is set to a first value which indicates that the first frame includes the first original data, and a DEI field included in a MAC header of the second frame is set to a second value which indicates that the second frame includes the second duplicated data.

5. The operation method according to claim 4, further comprising:
changing the priority of the second duplicated data to the original value before transmitting the second frame.

6. The operation method according to claim 4, further comprising, when the priority of the first original data is identical to the priority of the second duplicated data, setting the priority of the second duplicated data to a value lower than the priority of the first original data.

7. The operation method according to claim 4, wherein the changing of the priority of the second duplicated data comprises setting the priority of the second duplicated data to a highest priority value among priority values belonging to a best effort (BE) class.

8. The operation method according to claim 4, wherein the first original data and the second original data include data based on audio video bridging (AVB) protocol.

9. The operation method according to claim 4, wherein, when the first original data and the second duplicated data are obtained, the switch apparatus is determined as belonging to a contention section used for both a main path and a redundancy path, and the priority of the second duplicated data is set to a value lower than the priority of the first original data.

* * * * *